United States Patent [19]

Liang et al.

[11] Patent Number: 4,758,965
[45] Date of Patent: Jul. 19, 1988

[54] POLYGON FILL PROCESSOR

[75] Inventors: Bob C. Liang, West Hurley; Todd N. Tsakiris, Hempstead, both of N.Y.

[73] Assignee: International Business Machines Corporation, Armonk, N.Y.

[21] Appl. No.: 785,935

[22] Filed: Oct. 9, 1985

[51] Int. Cl.[4] .................. G06F 15/40; G06F 15/26
[52] U.S. Cl. ............................. 364/518; 364/526
[58] Field of Search ............... 364/518, 526; 340/703, 340/747; 382/21, 25

[56] References Cited

U.S. PATENT DOCUMENTS

| | | | |
|---|---|---|---|
| 3,480,943 | 11/1969 | Manber | 340/324 |
| 4,425,559 | 1/1984 | Sherman | 340/747 |
| 4,447,809 | 5/1984 | Kodama et al. | 340/747 |
| 4,475,104 | 10/1984 | Shen | 340/729 |
| 4,492,956 | 1/1985 | Collmeyer et al. | 340/723 |
| 4,631,690 | 12/1986 | Corthout et al. | 364/526 |
| 4,648,045 | 3/1987 | Demitvescu | 364/518 |

FOREIGN PATENT DOCUMENTS

83/02510 7/1983 PCT Int'l Appl. .

OTHER PUBLICATIONS

J. E. Bresenham "Algorithm for Computer Control of a Digital Plotter, IBM Systems Journal vol. 4, No. 1, 1965, p. 25.
R. J. Llewelyn and A. M. Robins, "Generation of Points Using Bresneham's Algorithm", IBM Technical Disclosure Bulletin, vol. 20, No. 9, Feb. 1978, p. 3703.

Primary Examiner—Parshotam S. Lall
Assistant Examiner—Ellis B. Ramirez
Attorney, Agent, or Firm—George E. Clark

[57] ABSTRACT

Method and apparatus for filling convex polygons for display in a raster graphics system is described. Starting from the bottom of the polygon, horizontal lines are drawn to fill the polygon as y-value increments. A polygon-fill processor includes two modified Breshenham line generators.

3 Claims, 10 Drawing Sheets

LINE 1                    LINE 12

FIG.3

| HEX ADD | |
|---|---|
| 100 | X1 |
| 102 | Y1 |
| 104 | X2 |
| 106 | Y2 |
| 108 | X3 |
| 10A | Y3 |
| 10C | X4 |
| 10E | Y4 |
| 110 | X5 |
| 112 | Y5 |

FIG.4

IN THE ABOVE EXAMPLE

| PG1 | PG2 | EDGPTR1 | EDFPTR2 | COUNT |
|---|---|---|---|---|
|  |  | 10C | 10C | 5 |
| P4 | P4 | 10C | 10C | 4 |
| P4P5 |  | 110 | 10C | 3 |
|  | P4P3 | 110 | 108 | 2 |
| P5P1 |  | 100 | 108 | 1 |
|  | P3P2 | 100 | 104 | 0 |
| P1P2 |  | 104 | 104 | -1 (STOP PROCESSING) |

FOR OTHER CASES, SEE FIG.5
F. WHEN THE COUNTER BECOMES NEGATIVE, THEN
THE PROCESS OF THE GRAPHICS PROCESSOR STOPS

FIG.5a

| PG1 | PG2 | COUNT |
|---|---|---|
| P3 | P3 | 5 |
|  | P3 | 4 |
| P3P4 |  | 3 |
|  | P3P2 | 2 |
| P4P5 |  | 1 |
|  | P2P1 | 0 |
| P5P1 |  | -1 |

FIG. 5b

| PG1 | PG2 | | COUNT |
|---|---|---|---|
| P3 | P3 | | 5 |
| P3P4 | | | 4 |
| | P3P2 | | 3 |
| | | | 2 |
| P4P5 | | | 1 |
| | P2P1 | | 0 |
| P5P1 | | | -1 |
| (PG2 STOPS) | | | |

FIG. 5c

| PG1 | PG2 | COUNT |
|---|---|---|
| P4 | P4 | 5 |
| P4P5 | | 4 |
| | P4P3 | 3 |
| | P3P2 | 2 |
| | P2P1 | 1 |
| P5P1 | | 0 |
| | | -1 |

FIG. 5d

|  |  | COUNT |
|---|---|---|
| PG1 | PG2 | 5 |
| P3 | P3 | 4 |
| P3P4 |  | 3 |
|  | P3P2 | 2 |
| P4P5 |  | 1 |
|  | P2P1 | 0 |
|  | P1P5 | -1 |

FIG. 6

SIGNALS CONTROL THE UP-DOWN COUNTER DL & XPOS

XINC1=1

PG1      SIGNX=SIGN(DELTAX)

|  | SIGNX=1 | SIGNX=0 |
|---|---|---|
| DL | +1 | -1 |
| XPOS | -1 | +1 |

XINC2=1

PG2      SIGNX=SIGN(DELTAX)

|  | SIGNX=1 | SIGNX=0 |
|---|---|---|
| DL | -1 | +1 |

FIG. 7

FIG. 8  POINT GENERATOR

X1INC= ¬(X1TY) + X1TY ¬(INCR1)
INC1=YINC=X1TY + ¬(X1TY) ¬(INCR1) (INCR1 IS ACTIVE LOW)

IF DY > DX, THEN Y WILL BE INCREMENTED AT EVERY CYCLE
IF DY =< DX, THEN Y WILL BE INCREMENTED ONLY WHEN
D(N) >= 0, OR WHEN THE ¬ (INCR1) SIGNAL IS ASSERTED

FIG. 9

FIG. 10  VECTOR GENERATOR

LET DX=|DELTAX|
LET DY=|DELTAY|

ASSUME DX >DY

| | | | | | | | | | | | | | |
|---|---|---|---|---|---|---|---|---|---|---|---|---|---|
| INC1 | 0 | 0 | ... | 1 | 0 | 0 | ... | 0 | 0 | 0 | ... | | 0 |
| INC2 | 0 | 0 | | 0 | 0 | 0 | | 1 | 0 | 0 | | | 0 |
| PG1 START | 1 | 0 | (*) | 0 | 0 | 0 | | 0 | 0 | 0 | | | 1 |
| PG1 HOLD | 1 | 0 | | 0 | 1 | 1 | (**) | 1 | 1 | 1 | | | 1 |
| PG2 START | 0 | 0 | | 0 | 1 | 0 | | 0 | 0 | | | | 0 |
| PG2 HOLD | 1 | 1 | | 1 | 1 | 0 | | 0 | 1 | | | | 1 |
| PG1 RESTART | 0 | 0 | | 0 | 0 | 0 | | 0 | 0 | | | | 0 |
| PG2 RESTART | 0 | 0 | | 0 | 0 | 0 | | 0 | 0 | | | | 0 |
| VGSETUP | 0 | 0 | | 0 | 0 | 0 | | 0 | 1 | 1 | 1 | 0 | 0 | 0 |
| XSTROBE | 0 | 0 | | 0 | 0 | 0 | | 0 | 0 | 1 | 0 | 0 | 0 | 0 |
| YSTROBE | 0 | 0 | | 0 | 0 | 0 | | 0 | 0 | 0 | 1 | 0 | 0 | 0 |
| START LINE | 0 | 0 | | 0 | 0 | 0 | | 0 | 0 | 0 | 0 | 1 | 1 | 0 |
| CONT | 0 | 0 | | 0 | 0 | 0 | | 0 | 0 | 0 | 0 | 0 | 1 | 0 |
| RUNNING | 0 | 1 | | 1 | 1 | 1 | | 1 | 0 | (***) | | | 0 | 1 |
| PG1DONE | 0 | 0 | | 0 | 0 | 0 | | 0 | 0 | | | | | 0 |
| PG2DONE | 0 | 0 | | 0 | 0 | 0 | | 0 | 0 | | | | | 0 |
| PGDONE | 0 | 0 | | 0 | 0 | 0 | | 0 | 0 | | | | | 0 |

(*) PG1 RUNS UNTIL Y INCREMENTS
(**) PG2 RUNS UNTIL Y INCREMENTS
(***) VG BEGINS EXECUTION HERE

POLYGON FILL PROCESSOR

BACKGROUND OF THE INVENTION

1. Field of the Invention

The present invention relates to information handling systems and more particularly to information handling systems including method and apparatus for processing graphics image data.

2. Description of the Prior Art

Generally, in graphic display systems, the process of filling polygons has two identifiable stages. First there is the preprocessing step of setting up the edges of the polygon and second there is the scanning process which fills the area of a polygon by inserting lines between the polygon edges. Polygons may generally be considered to be convex or concave. By far the majority of polygons used in graphics systems drawings are convex polygons. Preprocessing for convex polygons is simpler and lends to easier implementation than does preprocessing for concave polygons.

The following are graphic systems including polygon fill processes representative of the prior art.

U.S. Pat. No. 4,425,559 shows a method and apparatus which utilizes information describing linear line segments to define polygonal areas which are capable of movement and changes in size or shape on a graphics display.

The patent employs an algorithm which uses line slope to generate end points of lines. The method for generating end points described in this patent does not provide as accurate an edge position as does fill processors employing a modified Bresenham algorithm to generate line end points.

PCT Published Application WO No. 83/02510 shows method and apparatus for filing polygons displayed by a color CRT monitor in a raster graphics system in which boundary pixels define initial and terminal pixels for each fill element and where fill lines coincide with horizontal scan lines.

The published application deals only with the scanning stage of polygon fill processing. The application does not teach method and apparatus which takes advantage of characteristics of convex polygons to simplify the algorithm and the logic to perform the polygon fill operation.

U.S. Pat. No. 4,447,809 generates edge data corresponding to individual horizontal scan lines to form polygons.

However, as with the other prior art systems identified herein, this patent does not recognize or take advantage of efficiencies and simplifications of the method and apparatus from a recognition of special characteristics of convex polygons to be displayed.

U.S. Pat. No. 4,475,104 discusses a display system for displaying 3-dimensional images on 2-dimensional raster display systems wherein the image to be displayed is represented as a polygon.

As with the other prior art systems represented herein, this patent does not recognize or take advantage of efficiencies and simplifications of the method and apparatus from a recognition of special characteristics of convex polygons to be displayed.

U.S. Pat. No. 4,492,956 teaches a graphic display system including a memory circuit for storing vector data representing a graphics image, a raster memory and a processor for controlling the operation of the vector memory and the raster memory.

Although the patent generally deals with method and apparatus for forming polygons, the patent as the other prior art systems presented herein, does not recognize or take advantage of efficiencies and simplification of the method and apparatus from a recognition of special characteristics of convex polygons to be displayed.

An article by J. E. Bresenham entitled "Algorithm for Computer Control of a Digital Plotter", IBM Systems Journal, Vol. 4 No. 1 1965 at page 25, describes an algorithm for plotting data as linear segments joining discrete data points. Although the article presents an algorithm for generating data points to connect linear segments, and may be used to control a vector generator portion of the present invention, the algorithm does not recognize or take advantage of efficiencies and simplification of the method as applied to drawing fill line in convex polygons.

An article entitled "Generation of Points using Bresenham's Algorithm" in IBM Technical Disclosure Bulletin, Vol. 20, No. 9, February 1978 at page 3703, describes an application of the Bresenham algorithm to generation of points along a line. The technique described in the article may be used to implement a point generator for use with a preferred embodiment of the present invention. However, as with Bresenham, the algorithm presented does not recognize or take advantage of efficiencies and simplification of the method as applied to drawing fill lines in convex polygons.

The prior art discussed above does not teach nor suggest the present invention as disclosed and claimed herein.

SUMMARY OF THE INVENTION

Therefore, it is an object of the present invention to calculate polygon fill line characteristics in a graphics processing system including a program storage for storing control information and input data; means for determining coordinates of edge lines of a polygon defined by the input data; means for generating parameters for a plurality of fill lines connecting the edge lines to fill the polygon; means for generating pixel characteristics for each of the fill lines; pixel storage means for storing pixel characteristics for display on a display device; and processor means connected to the program storage, the coordinate determining means, the parameter generating means, the pixel characteristic generating means, and the pixel storage means for controlling the calculation of polygon fill line characteristics.

Accordingly, method and apparatus according to the present invention for calculating polygon fill line characteristics in a graphics processing system includes first storage means for storing control information and input data; means for determining coordinates of edge lines of a polygon defined by input data; means for generating parameters for fill lines connecting the edge lines to fill said polygon; means for generating pixel characteristics for each fill line; second storage means for storing pixel characteristics for display on a display device; and processor means connected to the first storage means, the coordinate determining means, the parameter generating means, the pixel characteristic generating means, and the second storage means for controlling the calculation of polygon fill line characteristics.

The foregoing and other objects, features and advantages of the invention will be apparent from the more particular description of the preferred embodiments of

BRIEF DESCRIPTION OF THE DRAWING

FIG. 11, which includes FIGS. 11.1 and 11.2, is a flow diagram of a polygon fill process in accordance with the present invention.

In the drawing, like elements are designated with similar reference numbers, and identical elements in different specific embodiments are designated by identical reference numbers.

DESCRIPTION OF A PREFERRED EMBODIMENT OF THE INVENTION

Figure 1:
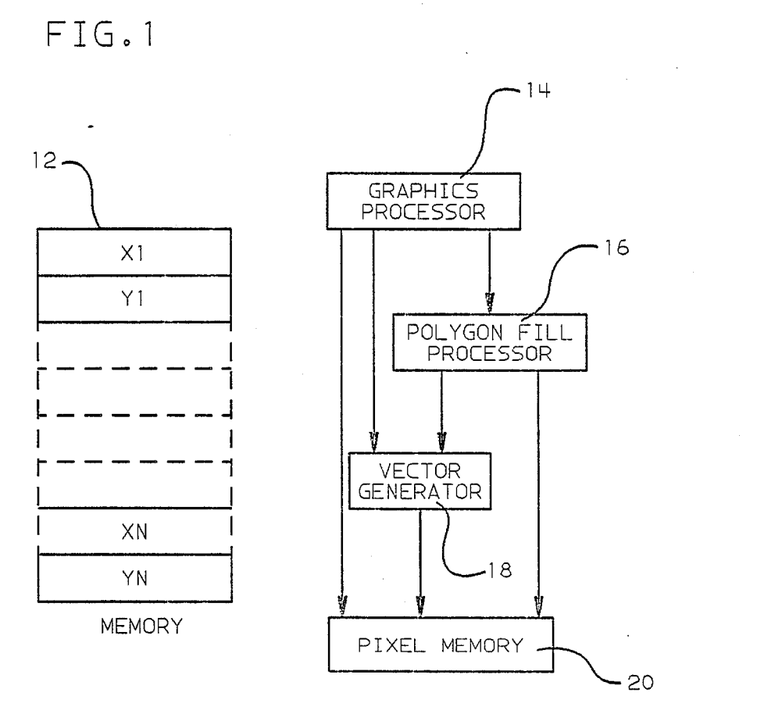
FIG. 1 is a block diagram of a graphics data processing system according to the present invention.

Referring now to FIG. 1, a preferred embodiment of the present invention will be described. A basic graphics system embodying the present invention includes a memory 12, a graphics processor 14, a polygon-fill processor 16 a vector generator 18 and a pixel memory 20.

Memory 12 contains the user program, e.g. the list of vertices of a polygons—pairs of 16-bit numbers (x,y).

Graphics processor 14 may be either a general purpose processor or a bit-slice processor. It traverses the user program in memory, and passes the information to vector (line) generator 18, which then generates pixel data for storage in pixel memory 20.

In the case of drawing a line, graphics processor 14 first loads the initial x,y value of a polygon vertex to the pixel memory 20, then passes the difference of the x,y values of the end points of the line delta x, delta y to vector generator 18.

The polygon-fill processor 16 consists of two modified Bresenham line generators, called point generators PG1 and PG2. It takes two edges of a polygon as input from the graphics processor 14, and then generates the parameter for the horizontal scan lines between these two edges and passes them to pixel memory 20 and vector generator 18.

Figure 2B:
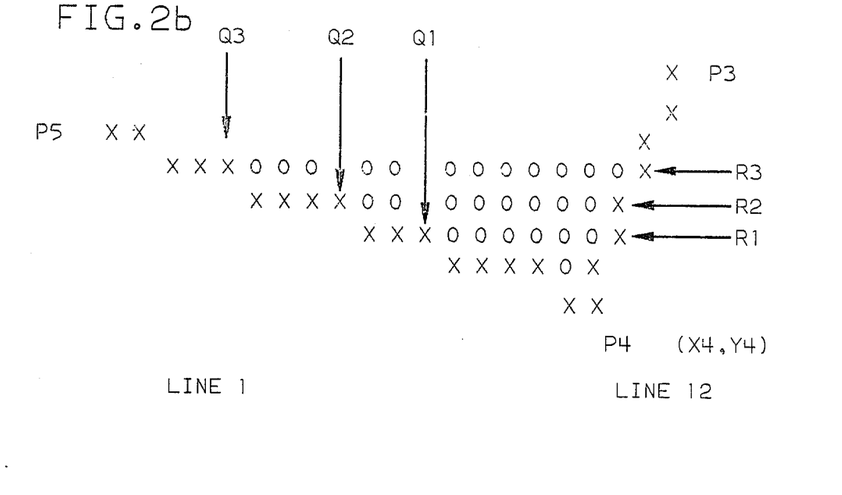
FIG. 2b is a schematic diagram of a portion of a polygon showing filling of an area between two lines of the polygon portion in accordance with the present invention.
Figure 3:
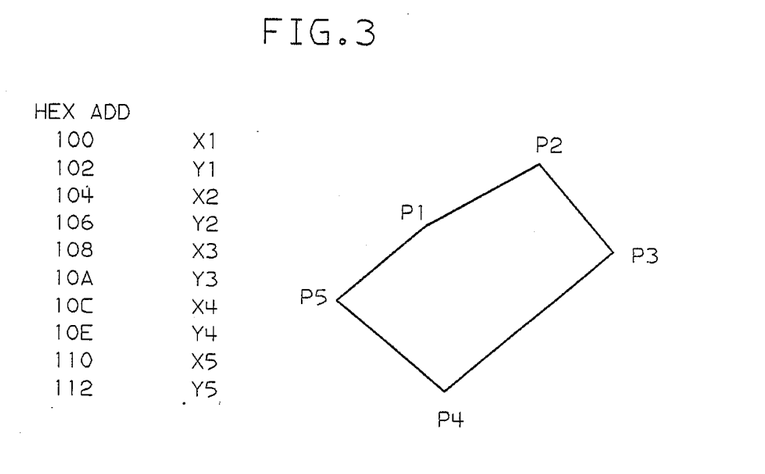
FIG. 3 is a line diagram of a five sided convex polygon to be filled by the apparatus and method of the present invention.
Figure 4:
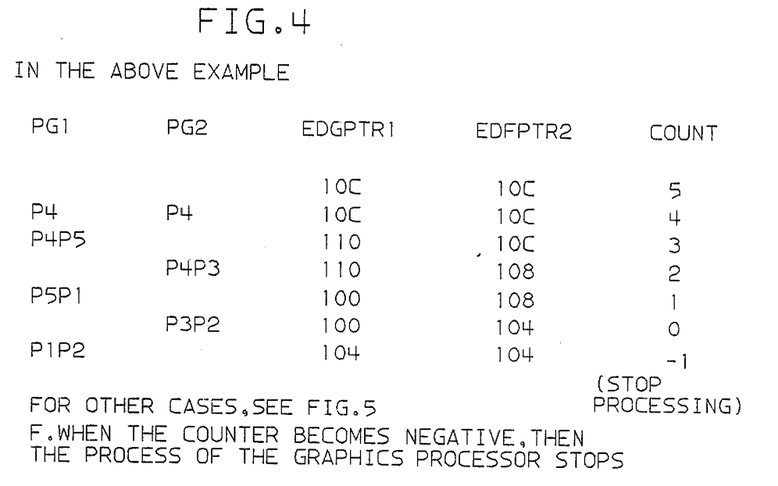
FIG. 4 is a table showing register contents during fill processing for a five sided polygon in accordance with the present invention.
Figure 5A:
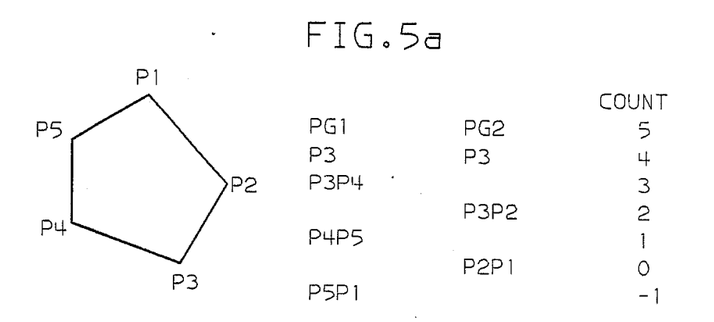
FIG. 5a is a diagram showing the line segments being processed by each of the Point Generators and the line counter for a second example of a five sided polygon in accordance with the present invention.
Figure 5B:
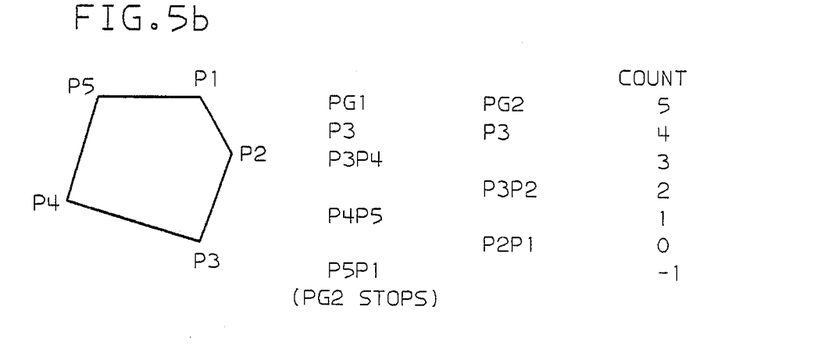
FIG. 5b is a diagram showing the line segments being processed by each of the Point Generators and the line counter for a third example of a five sided polygon in accordance with the present invention.
Figure 5C:
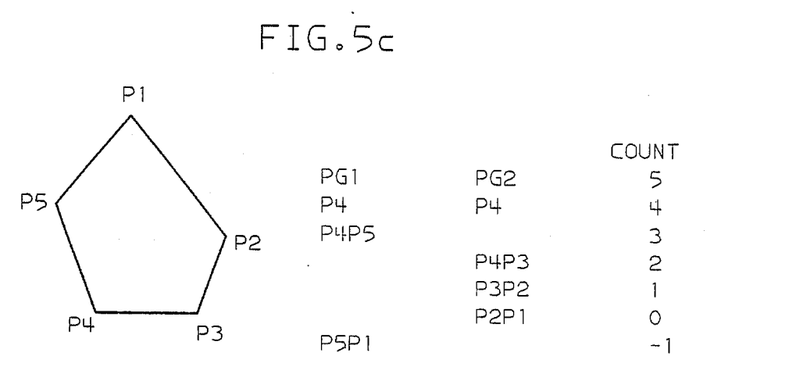
FIG. 5c is a diagram showing the line segments being processed by each of the Point Generators and the line counter for a fourth example of a five sided polygon in accordance with the present invention.
Figure 5D:
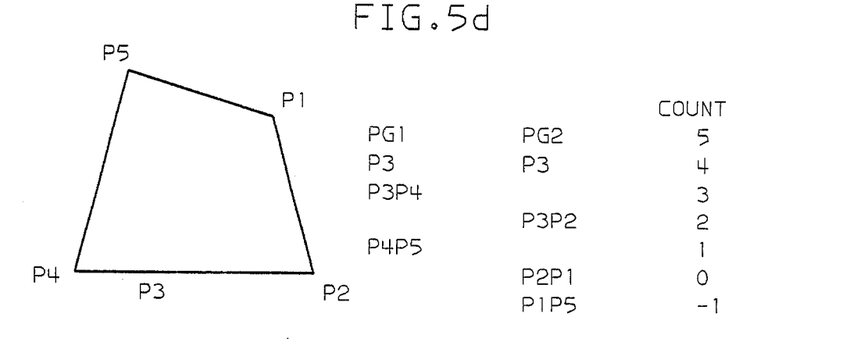
FIG. 5d is a diagram showing the line segments being processed by each of the Point Generators and the line counter for a fifth example of a five sided polygon in accordance with the present invention.

Taking the polygon shown in FIG. 3 as an example,
a. The coordinates of p4—(x4,y4) are passed to pixel memory 20.
b. The parameters of the edge p4p5—(x5−x4,y5−y4) are passed to the point generator PG1, (See FIGS. 8 and 9) using p4 as starting point.
c. The parameters of the edge p4p3 are passed to the other point generator PG2 (See FIG. 9).
d. As shown in FIG. 2(b), the horizontal scan lines are generated from bottom to top to fill the polygon. The length of the scan lines generated are 2,7,10,15, etc.

The vector generator 18 generates pixels using the delta x, delta y data of the line to be plotted, from the current x,y position in the pixel memory 20. The vector generator 18 can be easily implemented by using the Bresenham Algorithm as set forth by Bresenham and Llewelyn et al discussed above.

The input to the vector generator 18 is delta x and delta y.

For a monitor resolution and a bit plane in pixel memory 20 of 1024 by 1024 bits, the coordinate system is $(0,1023) \times (0,1023)$ The input to the pixel memory 20 can be summarized as follows:
a. write x, write to the x-position on the screen.
b. write y, write to the y-position on the screen.
c. To move the (x,y) position to the 8 neighboring positions by one pixel, the following signals are needed: for x-direction

|  | posx | dirx |
| --- | --- | --- |
| right | 1 | 1 |
| left | 1 | 0 |
| no move | 0 | 0 or 1 | for y-direction

|  | posy | diry |
| --- | --- | --- |
| up | 1 | 1 |
| down | 1 | 0 |
| no move | 0 | 0 or 1 |

DESCRIPTION OF POLYGON-FILL PROCESSOR 16

Figure 8:
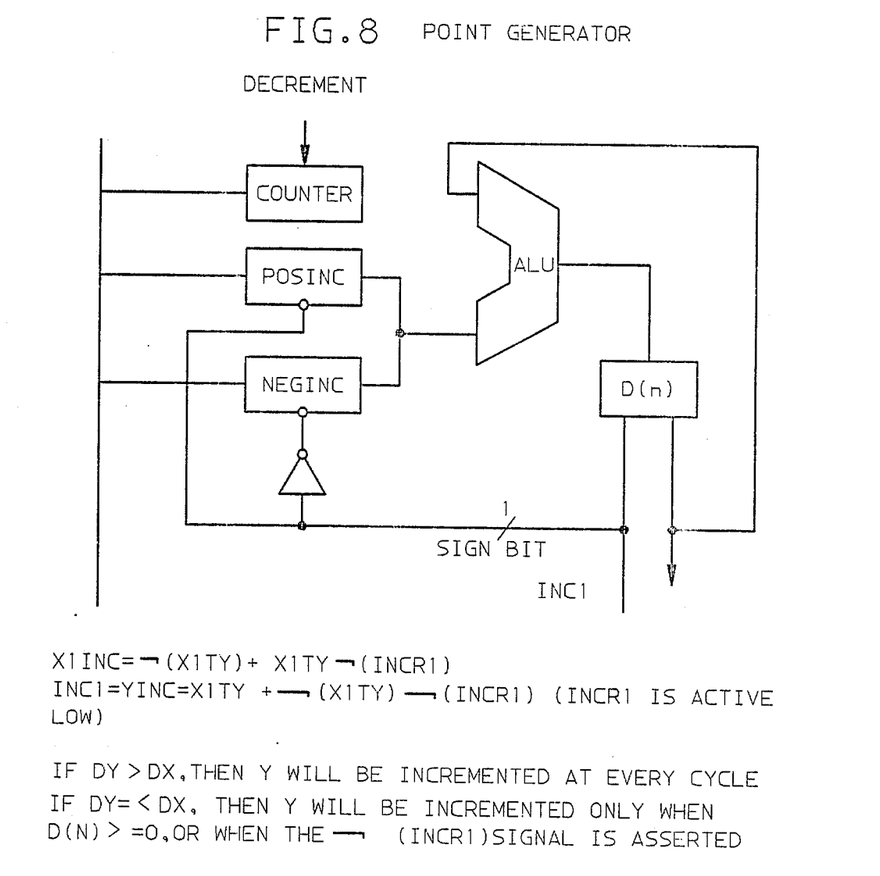
FIG. 8 is a block diagram of a Point Generator in accordance with the present invention.

The polygon-fill processor consists of two point-generators—PG1 and PG2, (See FIG. 8).

Since the polygon considered here is convex, each horizontal line can only intersect at most two edges. Beginning with a vertex with the minimum y-coordinate, (See FIG. 3 for example) from bottom to top, PG1 handles the edges to the left of the vertex, and PG2 the edges to the right of the vertex.

As shown in FIG. 2(b), PG1 generates pixels along the line p4p5, and PG2 generates line p4p3 by using the Bresenham algorithm. Starting from p4, the process stops whenever the y-value of the pixels generated increments by 1. Then a horizontal scan line is drawn between the two edges at that y-value.

The length of the scan line is contained in an up-down counter DL (FIG. 9) and the starting point of the scan line is contained in another up-down counter XPOS.

Figure 2A:
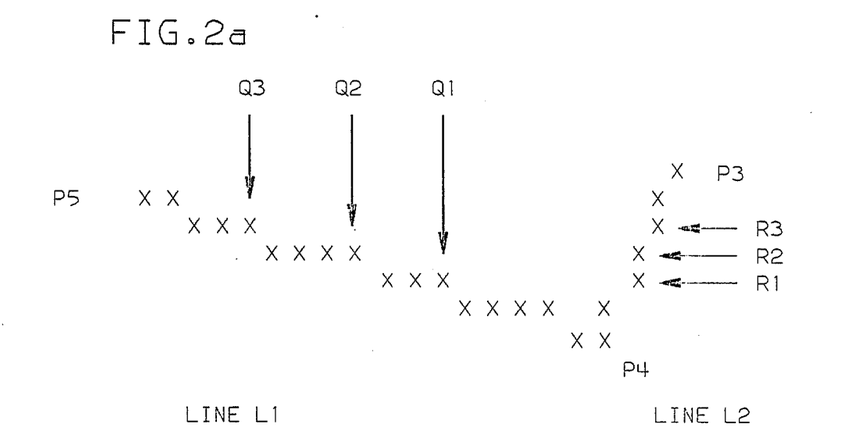
FIG. 2a is a schematic diagram of a portion of a polygon to be filled by the method and apparatus according to the present invention.

Suppose the two pixels just being generated in FIG. 2(a)(b) are q1 on line p4p5 and r1 on line p4p3, then counter DL contains 7, the length of segment q1r1; and XPOS contains x4−6, the x-coordinate of pixel q1.

Figure 7:
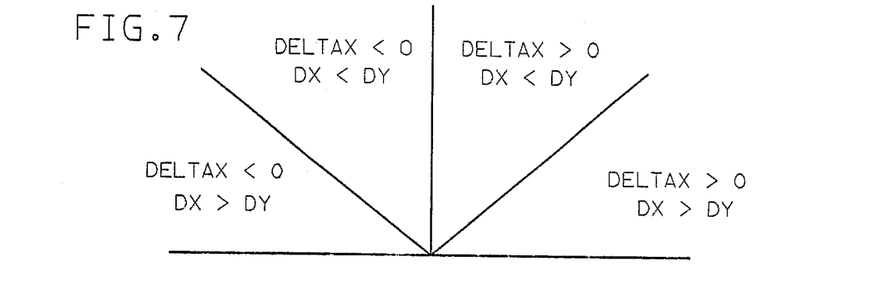
FIG. 7 is a diagram showing the relationship between the sign of delta x and the direction of fill processing.

To find the next scan line,

1. PG1 finds the next point up by applying Bresenham algorithm to locate the next pixel on the line, and adjusts DL and XPOS (FIG. 7); if the y-value of the new pixel increases by 1, then it is the point needed, otherwise
   a. the above process can be repeated until the y-value increments by 1; or
   b. the end of the line is reached, and a new line has to be fed into PG1 and the process can be repeated; or
   c. the end of the polygon-fill process is reached.

Assume q2 is the pixel thus generated on the line p4p5.

2. PG2 finds the next point up, r2 by using the same process.
3. Wait for Vector Generator 18 to finish drawing the previous scan line q141.
4. polygon-fill processor 16 moves the current position to q2 by
   a. sending the x-position of q2 to pixel memory by the signal xstrobe-writex.
   b. increment the y-value of the current position by 1 by the signal ystrobe-posy.diry
5. Polygon-fill processor 16 passes the parameter delta x=DL, and delta y=0 to the vector generator.
6. Repeat steps 1-5. (see FIG. 12)

OPERATION

The convex polygon to be filled is given by consecutive vertices p1,p2, . . ., pn; and pj=(xj,yj). The x,y values are in the screen coordinate—from 0 to 1023. As the graphics processor 14 traverses the list of vertices, it
a. plots the edges on the screen by sending the data to the vector generator and pixel memory; and
b. uses the following 4 registers:
   EDGSTART—the beginning address of the list;
   YBOT—the minimum of the y-value;
   BOTPTR—the address of the x-value corresponding to the minimum y-value;
   COUNT—the number of edges.
In FIG. 3 above, at the end of the process,
EDGSTART=100
YBOT=y4,
BOTPTR=10C,
COUNT=5
c. then use the x values of several consecutive vertices to determine the direction of the polygon—clockwise or counterclockwise. Use a flag DIR, which=0 if clockwise, else =1. e.g. x3−x4>0 in the above example sets DIR=0
d. load the beginning point for the polygon-fill to the pixel memory 20; in FIG. 3, the (x,y)-coordinates of p4.put the number 0 into the DL register in the polygon-fill processor, and the x-coordinate x4 of p4 into the XPOS register. load the delta x and delta y of the edge to the left of the beginning point to PG1, and those of the edge to the right to PG2; in FIG. 3, (x5−x4,y5−y4) are being passed to PG1, and (x3−x4,y3−y4) to PG2. Wait for a few cycles before starting the fill process, because the point generator setup delay—the Point Generator PG1 or PG2 (or Vector Generator 18) uses parameters derived from delta x and delta y (see FIG. 10)
e. start the polygon-fill processor (see FIG. 5)

Keep track of the edges passed to the Point generators PG1, PG2 by using the 5 registers above, together with two pointers EDGPTR1, which points to the x-value of the vertex being passed to the point-generator PG1 of the polygon-fill processor, and EDGPTR2, which points to the x-value of the vertex being passed to the point-generator PG2 of the polygon-fill processor 18.

f. When counter 82 becomes negative, then the process of the graphics processor 14 stops.

The following is an example of High-Level language Microcode to control the processing of fill lines according to the present invention.

```
ARFILL( )
SETUP:      /* LOAD X POSITION COUNTER WITH
            <BOTPTR> */
            /* LOAD Y POSITION COUNTER WITH
            YBOT */
            /* CLEAR DL COUNTER */
WAIT:       IF PGDONE THEN GOTO WAIT
            IF COUNT < 0 THEN GOTO DONE
PGDONE:     IF PG1DONE THEN
               OLDX := <EDGEPTR1>
               OLDY := <EDGEPTR1 + 1>
               IF DIR = 1 THEN
                  IF EDGEPTR1 = LASTEDGE THEN
                     EDGEPTR1 := EDGSTART
                  ELSE
                     EDGEPTR1 := EDGEPTR1 + 2
               ELSE
                  IF EDGEPTR1 = EDGSTART THEN
                     EDGEPTR1 := LASTEDGE
                  ELSE
                     EDGEPTR1 := EDGEPTR1 − 2
            DELTAX := <EDGEPTR1> − OLDX
            DELTAY := <EDGEPTR1 + 1> − OLDY
            COUNT := COUNT − 1
            /* LOAD PG1 WITH DELTAX,DELTAY */
            /* DELAY NUMBER OF CYCLES
            NECESSARY FOR PG TO SET UP FOR
            POINT GENERATION */
            /* ASSERT PG1RESTART SIGNAL */
         ELSE /* PG2DONE */
            OLDX := <EDGEPTR2>
            OLDY := <EDGEPTR2 + 1>
            IF DIR = 0 THEN
               IF EDGEPTR2 = LASTEDGE THEN
                  EDGEPTR2 := EDGSTART
               ELSE
                  EDGEPTR2 := EDGEPTR2 + 2
            ELSE
               IF EDGEPTR2 = EDGSTART THEN
                  EDGEPTR2 := LASTEDGE
               ELSE
                  EDGEPTR1 := EDGEPTR2 − 2
            DELTAX := <EDGEPTR2> − OLDX
            DELTAY := <EDGEPTR2 + 1> − OLDY
            COUNT := COUNT − 1
            /* LOAD PG2 WITH DELTAX,DELTAY */
            /* DELAY NUMBER OF CYCLES
            NECESSARY FOR PG TO SET UP FOR
            POINT GENERATION */
            /* ASSERT PG2RESTART SIGNAL */
         GOTO WAIT
```

DONE:    RETURN

POINT GENERATOR PG1 AND PG2

Figure 9:
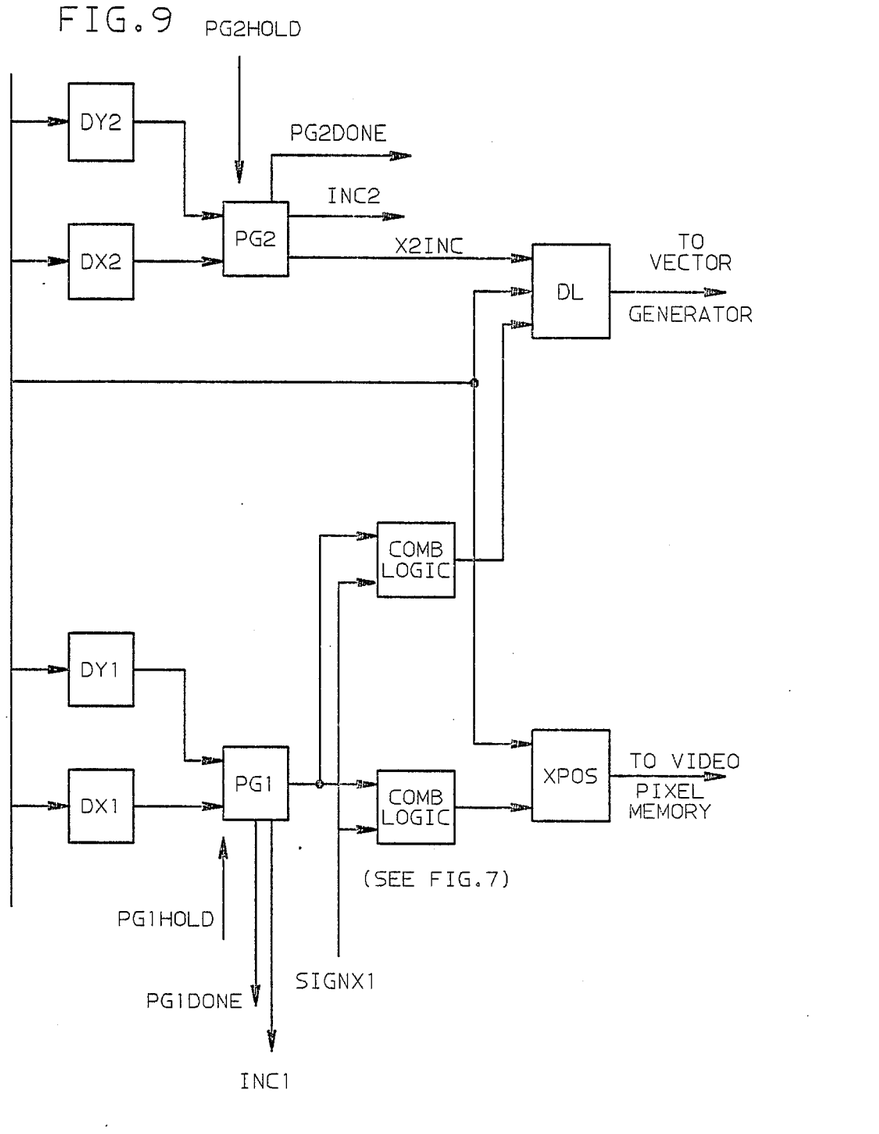
FIG. 9 is a block diagram of a Polygon Fill Processor in accordance with the present invention.

Point Generators PG1 and PG2 shown in FIGS. 8 and 9 are modified embodiments of the Bresenham line generator.

Figure 10:
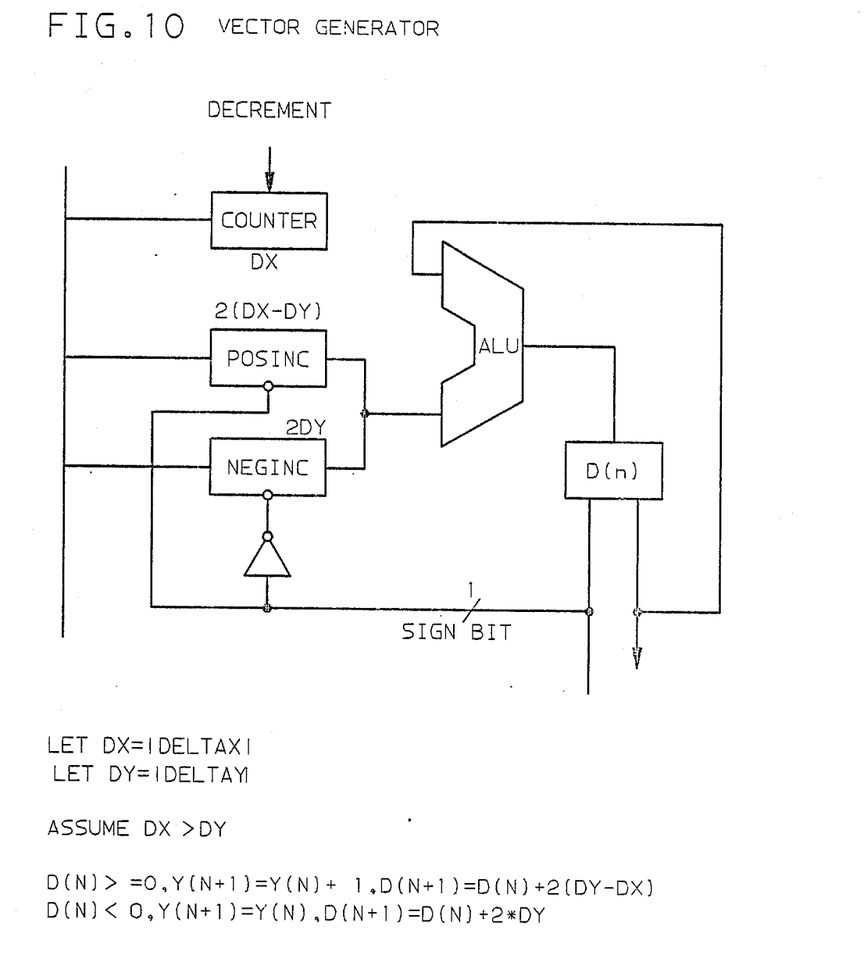
FIG. 10 is a block diagram of a Vector Generator in accordance with the present invention.

The Vector Generator 18 shown in FIG. 10, is set up as follows:

Microcode transforms delta x to its sign magnitude form SM(delta x) and delta y to its sign magnitude form SM(delta y).

Strobe in SM(delta x), sets sign x=sign (delta x).
Strobe in SM(delta y), sets sign y=sign (delta y).
VECTOR GENERATOR SETUP:
1. Compute SM(delta x)−SM(delta y)

Since $Dx=|delta\ x|$ and $Dy=|delta\ y|$ are 12 bit positive numbers,

2 SM(deltax)−SM(deltay)=2 delta x-delta y in (23 s complement). Therefore, the sign bit is xLTy.

2.
  a. If $xLTy=0$ (Dx=−→Dy)
    3. 2Dy→NEGINC 182
    4. 2(Dy−Dx)→POSINC 184
    5. 2Dy−Dx→DN 186
    6. Dx→COUNTER 188
2.
  b. If $xLTy=1$
    3. 2Dx→NEGINC 182
    4. 2(Dx−Dy)→POSINC 184
    5. 2Dx−Dy→DN 186
    6. Dx→COUNTER 188

Vector Generator 18 (See FIG. 10) includes processor means 190 for transforming the inputs delta x and delta y to the following parameters:

Let $DX=|delta\ x|$ and $DY=|delta\ y|$
if DX>Dy,
  then NEGINC $=2DY$, POSINC$=2(DY-DX)$, Counter$=DX$;
otherwise
  NEGINC=2DX, POSINC=2(DX−DY), Counter=DY.

The eight directions are determined by the 3 bits: sign(delta x), sign(delta y), sign(DX−DY).

Polygon Fill Processor

The polygon-fill processor 16 consists of 2 point generators—PG1 and PG2. (see FIGS. 8 and 9) Because both PG1 and PG2 generates pixels from bottom to top, there are only 4 directions determined by
sign$x$=sign(delta $x$), and
$xlty$=sign($DX-DY$); see FIG. 7.

Figure 6:
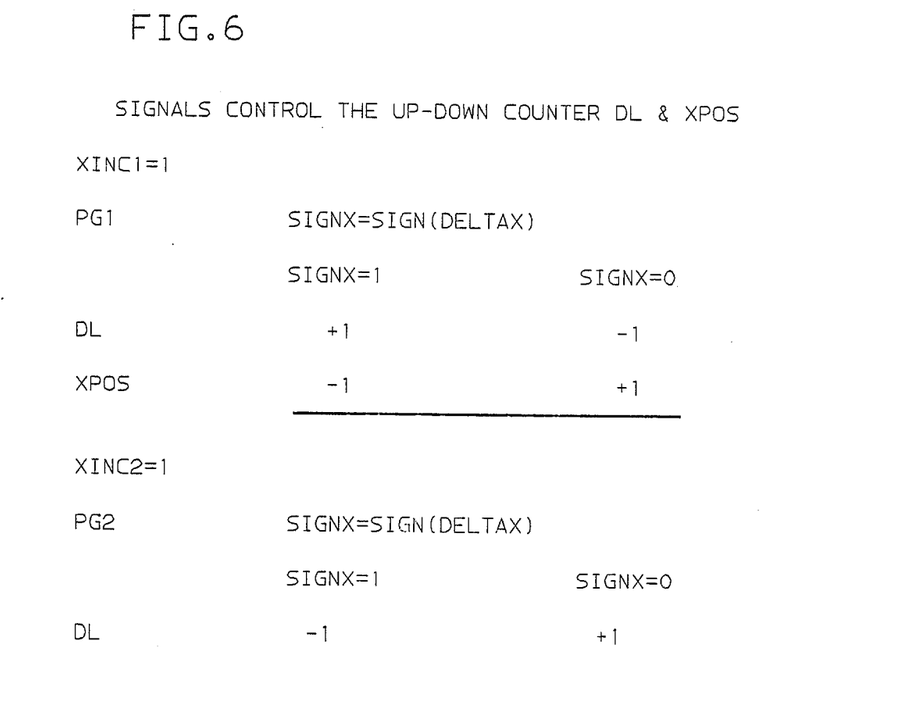
FIG. 6 is a table showing the control of counters DL and XPOS for Point Generators PG1 and PG2.

For PG1, there are several external signals or control lines:

PG1DONE—signals that the processing of the current line is done;

INC1—signals that the y-value of the pixel generated increment by 1;

PB1HOLD—stop PG1 because PG2 is running, or a new line is being loaded, or the polygon-fill processor is passing the parameters to the vector generator;

X1INC—as the next pixel is generated, X1INC increases (or decreases) the length of scan line register DL by 1 and decrease (or increase) the initial position of the scan line register by 1; see FIG. 6.

In vector generator 18 (FIGS. 8 and 10), let INCR denote the sign bit of Dsubn, the decision variable.

If Dx>Dy, then the y-value will be incremented at every counter 188 cycle; otherwise, the y-value will be incremented only when the decision variable Dsubn>0, or when the (INCR- -) signal is asserted high.

In the case of PG1, let INCR1 be the equivalent of INCR, then

X1INC=($xlty$- -)+xlty. (INCR1- -)
INC1=$xlty$+(xlty- -). (INCR1- -)

For PG2, there are several external signals or control lines:

PG2DONE—signals that the processing of the current line is done;

INC2—signals that the y-value of the pixel generated increment by 1;

PG2HOLD—stop PG2 because PG1 is running, or a new line is being loaded, or the polygon-fill processor 16 is passing the parameters to the vector generator 18;

X2INC—as the next pixel is generated, X2INC increases (or decreases) the length of scan line register DL by 1, see FIG. 6.

In the case of PG2, let INCR2 be the equivalent of INCR, then

X2INC=($xlty$- -)+$xlty$. (INCR2 - -)
INC2=$xlty$+($xlty$- -). (INCR2 - -)
POLYGON-FILL CYCLES: (SEE FIGS. 11 and 12.)

Figure 12:
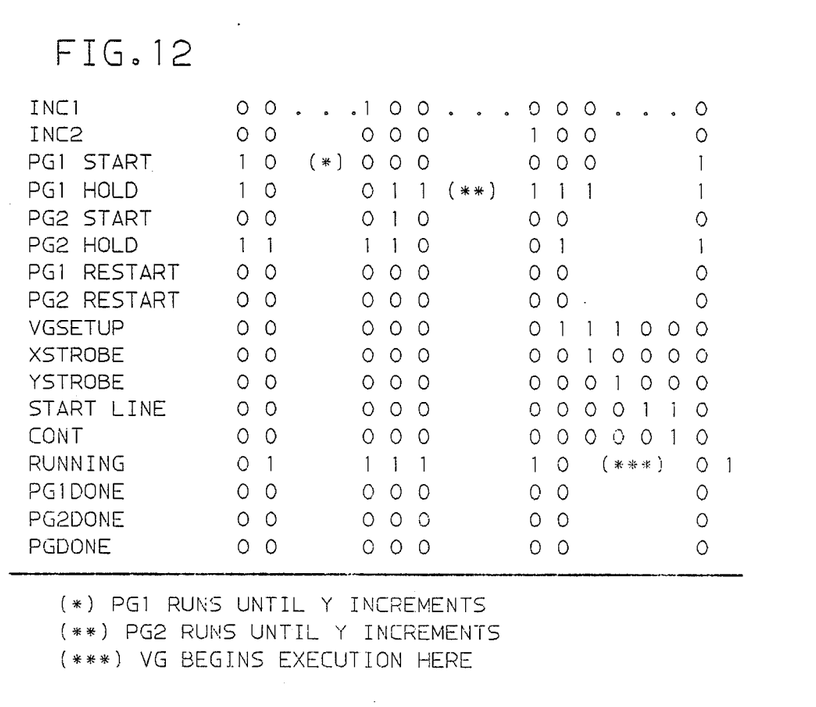
FIG. 12 is a chart showing the signal sequence for drawing a horizontal line in accordance with the present invention.

1. Microcode asserts DOFILL.
2. A cycle later, PG1 start is asserted.
3. PG1 begins cycling, halts when y-value increments (INC1=1) and/or line segment is finished (PG1DONE=1).
4. If PG1DONE, PG1 is loaded with next delta x, delta y (if there is one), and microcode asserts PG1RESTART to restart PG1.
5. If INC1 was not also asserted, PG1 continues execution; if INC1 was asserted, then PG2 begin execution.
6. PG2 halts when the y-value increments and/or a line segment is finished.
7. If PG2DONE, PG2 is loaded with next delta x, delta y (if there is one); and microcode asserts PG2RESTART to restart PG2.
8. If INC2 was not also asserted, PG2 continues execution; If INC2 was asserted, then enter the Vector Generator Set Up stage:
9. After checking Vector Generator is idle (VGBUSY- -), VGSETUP is asserted.
10. A cycle later, XSTROBE loads the Vector Generator with DL, and at the same time loads the Pixel Memory x-position counter with the value of XPOS.
11. A cycle later, YSTROBE loads the Vector Generator with 0 as the delta y parameter, and at the same time increments the content of the y-position counter of the Pixel Memory.
12. A cycle later, STARTLINE is asserted.
13. A cycle later, CONT is asserted.
14. A cycle later, PG1START is asserted. Repeat the process.

Microcode Logic Equations

The microcode logic equations for generating the above required signals are as follows:

PGDONE    = PG1DONE + PG2DONE
PG1HOLDT  ← (PG1HOLD + INC1) ·
          $\overline{\text{(PG1START + PG1RESTART)}}$

```
                    -continued
PG2HOLDT  ← (PG2HOLD + INC2) ·
                  ─────────────────────
                  (PG2START + PG2RESTART)

PG1HOLD   = PG1HOLDT + PGDONE
PG1HOLD   = PG2HOLDT + PGDONE
PG1START  ← DOFILL + CONT
PG2START  ← INC1 · RUNNING

VGSETUP   ← VGSETUP · ‾ySTROBE‾ + INC2 · RUNNING xSTROBE   ← VGSETUP · ‾VGBUSy‾;  Also load x position ctr
                                  with contents of xPOS ySTROBE   ← xSTROBE         ; Also increment y
                                position ctr STARLINE  ← STARLINE · ‾CONT‾ + ySTROBE

CONT      ← ‾PGDONE‾ · STARLINE

BUSy      ← BUSy · ‾INC2‾ + PG1START + PG2START +
                 PG1RESTART + PG2RESTART

RUNNING   = BUSy · ‾PGDONE‾
```
←: Clocked
=: Immediate

Thus, while the invention has been described with reference to preferred embodiments thereof, it will be understood by those skilled in the art that various changes in form and details may be made without departing from the scope of the invention.

What is claimed is:

1. Apparatus for calculating polygon fill line characteristics in a graphics processing system comprising: first storage means for storing control information and input data; means for determining coordinates of edge lines of a polygon defined by said input data; means for generating parameters for a plurality of fill lines connecting said edge lines to fill said polygon; vector generator means for generating pixel characteristics for each of said plurality of fill lines; second storage means for storing said pixel characteristics for display on a display device; and processor means connected to said first storage means, said coordinate determining means, said parameter generating means, said pixel characteristic generating means, and said second storage means for controlling the calculation of polygon fill line characteristics.

2. Apparatus according to claim 1 further comprising: means for passing parameters of a first edge and a second edge of said polygon to a polygon fill processor; and means for determining a length of a first fill line to be drawn along a first axis between a first point on said first and second edges.

3. Apparatus according to claim 2 wherein said polygon fill processor further comprises: first and second point generators for generating parameters of said fill lines.

* * * * *